(12) United States Patent
Nose et al.

(10) Patent No.: US 7,180,679 B2
(45) Date of Patent: Feb. 20, 2007

(54) IMAGE-TAKING APPARATUS

(75) Inventors: Hiromichi Nose, Sakai (JP); Mamoru Terada, Sakai (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 10/874,855

(22) Filed: Jun. 23, 2004

(65) Prior Publication Data

US 2005/0200968 A1   Sep. 15, 2005

(30) Foreign Application Priority Data

Mar. 11, 2004   (JP)   ............... 2004-069391

(51) Int. Cl.
  *G02B 15/14*   (2006.01)
  *H04N 5/262*   (2006.01)
(52) U.S. Cl. ............... 359/682; 359/680; 348/240.3
(58) Field of Classification Search ............ 348/240.3; 359/680, 682, 689
  See application file for complete search history.

(56) References Cited

U.S. PATENT DOCUMENTS 5,745,301 A   4/1998   Betensky et al. ............ 359/689
6,781,770 B1 *   8/2004   Chang et al. ................ 359/689
6,804,064 B2 *   10/2004   Hirakawa .................... 359/682
6,917,476 B2 *   7/2005   Eguchi ........................ 359/689
7,042,652 B2 *   5/2006   Nose et al. .................. 359/689

FOREIGN PATENT DOCUMENTS

| JP | 10-311946 A | 11/1998 |
| JP | 2000-267009 A | 9/2000 |
| JP | 2001-343587 A | 12/2001 |
| JP | 2002-072091 A | 3/2002 |
| JP | 2003-050352 A | 2/2003 |

OTHER PUBLICATIONS

"Notification of Reason(s) for Refusal" issued by the Japanese Patent Office, mailed Mar. 14, 2006, concerning counterpart application JP 2004-069391, with an English translation thereof.

* cited by examiner

*Primary Examiner*—David N. Spector
(74) *Attorney, Agent, or Firm*—Sidley Austin LLP (57) ABSTRACT

A zoom lens system for forming an optical image of a subject on the image-sensing surface of an image sensor has three lens units, namely, from the object side thereof, a first lens unit having a negative optical power, a second lens unit having a positive optical power, and a third lens unit having a positive optical power. The lens units each include at least one plastic lens element. The zoom lens system as a whole includes at least one glass lens element that fulfills a prescribed conditional formula.

17 Claims, 6 Drawing Sheets

FIG.4A
FNO=2.86

(W)

—— d
----- SC

-0.1  0.1
SPHERICAL SINE
ABERRATION CONDITION

-0.1  0.1
ASTIGMATISM

FIG.4C
Y'=3.5

-5.0  5.0
DISTORTION%

FIG.4D
FNO=3.68

(M)

—— d
----- SC

-0.1  0.1
SPHERICAL SINE
ABERRATION CONDITION

-0.1  0.1
ASTIGMATISM

FIG.4F
Y'=3.5

-5.0  5.0
DISTORTION%

FIG.4G
FNO=4.90

(T)

—— d
----- SC

-0.1  0.1
SPHERICAL SINE
ABERRATION CONDITION

-0.1  0.1
ASTIGMATISM

FIG.4I
Y'=3.5

-5.0  5.0
DISTORTION%

FIG.5A
FNO=2.87

(W)

— d
- - - SC

-0.1  0.1
SPHERICAL SINE
ABERRATION CONDITION

-0.1  0.1
ASTIGMATISM

FIG.5C
Y'=3.5

-5.0  5.0
DISTORTION%

FIG.5D
FNO=3.54

(M)

— d
- - - SC

-0.1  0.1
SPHERICAL SINE
ABERRATION CONDITION

-0.1  0.1
ASTIGMATISM

FIG.5F
Y'=3.5

-5.0  5.0
DISTORTION%

FIG.5G
FNO=4.90

(T)

— d
- - - SC

-0.1  0.1
SPHERICAL SINE
ABERRATION CONDITION

-0.1  0.1
ASTIGMATISM

FIG.5I
Y'=3.5

-5.0  5.0
DISTORTION%

FIG.7

IMAGE-TAKING APPARATUS

This application is based on Japanese Patent Application No. 2004-069391 filed on Mar. 11, 2004, the contents of which are hereby incorporated by reference.

BACKGROUND OF THE INVENTION

1. Field of the Invention

The present invention relates to an image-taking apparatus, and more particularly to an image-taking apparatus that takes in an image of a subject optically through a zoom lens system and then outputs it in the form of an electrical signal by means of an image sensor, and among others to an image-taking apparatus provided with a compact, light-weight zoom lens system.

2. Description of the Prior Art

Today, digital cameras are quite popular. Digital cameras dispense with silver-halide film, and use instead an image sensor such as a CCD (charge-coupled device) or CMOS (complementary metal oxide semiconductor) sensor to convert an optical image into an electrical signal so that the optical image can be recorded and transferred in the form of digital data. A digital camera incorporates an image-taking apparatus provided with a lens system and an image sensor, and, in recent years, such image sensors have come to have increasingly large numbers of pixels. Correspondingly, the demand for high-performance image-taking apparatuses has been increasing greatly. Among others, compact image-taking apparatuses have been eagerly sought after that incorporate a zoom lens system that permits zooming without degrading image quality. In addition, in recent years, as the image processing performance of semiconductor devices and the like increases, more and more personal computers, mobile computers, cellular phones, personal digital assistants (PDAs), and the like have come to be internally or externally fitted with an image-taking apparatus having a zooming capability. This has been spurring on the demand for compact, high-performance image-taking apparatuses.

To make an image-taking apparatus compact, the zoom lens system incorporated therein needs to be made compact. Thus, many zoom lens systems have been proposed that aim at compactness. For example, so-called three-unit zoom lens systems composed of three lens units, namely, from the object side thereof, a first lens unit having a negative optical power, a second lens unit having a positive optical power, and a third lens unit having a positive optical power are proposed in the following patent publications:

Publication 1: U.S. Pat. No. 5,745,301
Publication 2: Japanese Patent Application Laid-Open No. 2001-343587

This type of zoom lens system, composed of a small number of optical elements and having a comparatively simple movement mechanism, has the advantage of being suitable to be made compact and other advantages.

Publications 1 and 2 disclose zoom lens systems in which aspherical surfaces are introduced in plastic lens elements. Using plastic lens elements makes introduction of aspherical surfaces easy, and also helps reduce costs. However, the zoom lens system disclosed in Publication 1 is composed of low-refractive-index aspherical-surface lens elements alone. Thus, disadvantageously, the aspherical surfaces have so great curvatures that they are difficult to produce. The zoom lens system disclosed in Publication 2 is composed of a large number of lens element. This makes it difficult to achieve compactness and cost reduction.

SUMMARY OF THE INVENTION

An object of the present invention is to provide a compact, easy-to-manufacture image-taking apparatus incorporating an inexpensive, high-optical-performance zoom lens system.

To achieve the above object, according to one aspect of the present invention, in a zoom lens system for forming an optical image of a subject on the image-sensing surface of an image sensor, the zoom lens system is provided with three lens units, namely, from the object side thereof, a first lens unit having a negative optical power, a second lens unit having a positive optical power, and a third lens unit having a positive optical power. Here, the lens units each include at least one plastic lens element, and the zoom lens system as a whole includes at least one glass lens element that fulfills the following conditional formula (1):

$$1.76 < Nav \tag{1}$$

where

Nav represents the average refractive index of the at least one glass lens element for the d-line.

According to another aspect of the present invention, in an image-taking apparatus provided with a zoom lens system that is composed of a plurality of lens units and that achieves zooming by varying the distances between the lens units and an image sensor that converts the optical image formed by the zoom lens system into an electrical signal, the zoom lens system is constructed as described in the preceding paragraph.

According to still another aspect of the present invention, in a camera provided with an image-taking apparatus that takes in an image of a subject optically and then outputs it in the form of an electrical signal, the image-taking apparatus is constructed as described in the preceding paragraph.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, image-taking apparatuses and the like embodying the present invention will be described with reference to the drawings. An image-taking apparatus according to the invention is an optical apparatus that optically takes in an image of a subject and then outputs it in the form of an electrical signal. Such an image-taking apparatus is used as a main component of a camera that is used to shoot a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital devices. As these examples show, by the use of an image-taking apparatus, it is possible not only to build a camera but also to incorporate an image-taking apparatus in various devices to provide them with a camera capability. For example, it is possible to realize a digital device provided with an image input capability, such as a cellular phone furnished with a camera.

Incidentally, the term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit exchange of images, including both those connected directly to a network and those connected to a network by way of a device, such as a personal computer, having an information processing capability).

Figure 7:
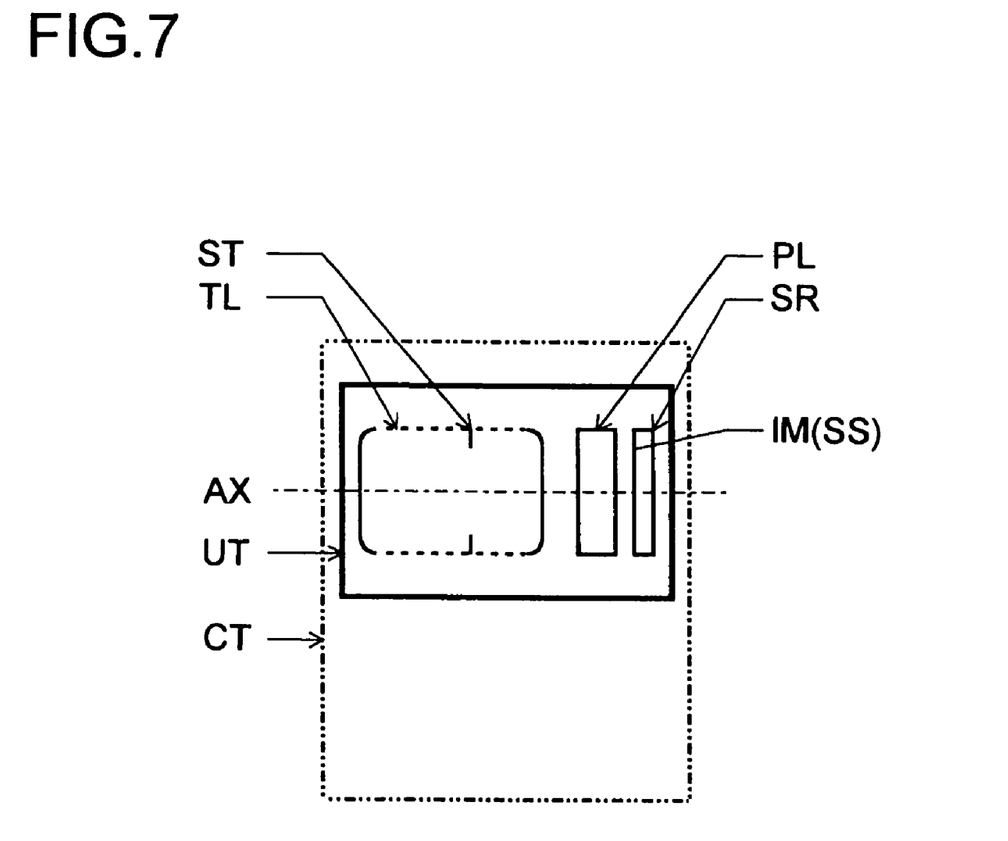
FIG. 7 is a diagram schematically showing an outline of the optical construction of an image-taking apparatus according to the invention.

FIG. 7 shows an example of the construction of an image-taking apparatus UT. This image-taking apparatus UT is composed of, from the object (i.e., subject) side thereof, a zoom lens system TL (corresponding to an image-taking lens system) for forming an optical image (image plane IM) of an object at a variable magnification, a parallel-plane plate PL (corresponding to an optical filter such as an optical low-pass filter or infrared cut filter arranged as required, and to the cover glass of an image sensor SR), and an image sensor SR for converting the optical image IM formed on the light-receiving surface SS thereof by the zoom lens system TL into an electrical signal. The image-taking apparatus UT is used as a component of a digital device CT corresponding to a digital camera, portable data device (i.e., a compact and portable data equipment terminal such as a cellular phone or PDA), or the like. When this image-taking apparatus UT is incorporated in a digital camera, the image-taking apparatus UT is usually arranged inside the body of the camera. Here, the camera capability can be realized in a desired manner that suits particular needs. For example, the image-taking apparatus UT may be built as a unit that is freely detachable from or freely rotatable relative to the body of the camera; or the image-taking apparatus UT may be built as a unit that is freely detachable from or freely rotatable relative to a portable data device (such as a cellular phone or PDA).

The zoom lens system TL is composed of a plurality of lens units, and is so constructed as to vary the magnification (i.e., achieve zooming) by moving those lens units along the optical axis AX in such a way as to vary the distances between them. In all the embodiments described later, the zoom lens system TL has a three-unit zoom construction composed of a negative, a positive, and a positive optical power. Used as the image sensor SR is, for example, a solid-state image sensor such as a CCD (charge-coupled device) or CMOS (complementary metal oxide semiconductor) sensor having a plurality of pixels. The optical image formed by the zoom lens system TL (on the light-receiving surface SS of the image sensor SR) is converted into an electrical signal by the image sensor SR. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another device through a cable or after being converted into an infrared signal.

In the image-taking apparatus UT shown in FIG. 7, the zoom lens system TL performs reduction-projection from the subject located on the enlargement side to the image sensor SR located on the reduction side. It is, however, also possible to use instead of the image sensor SR a display device (for example, a liquid crystal display device) that displays a two-dimensional image, and use the zoom lens system TL as a projection lens system. In this way, it is possible to realize an image projection apparatus that performs enlargement-projection from the image display surface located on the reduction side to a screen surface located on the enlargement side. That is, the zoom lens systems TL of all the embodiments described below can be suitably used not only as an image-taking lens system but also as a projection lens system.

Figure 1:
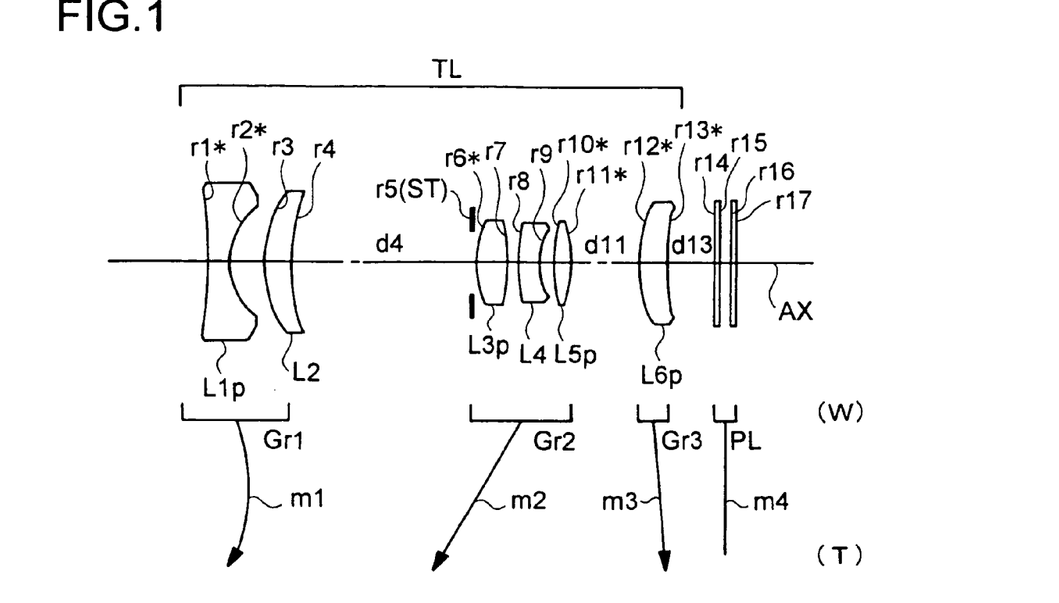
FIG. 1 is a lens construction diagram of a first embodiment (Example 1) of the invention.
Figure 2:
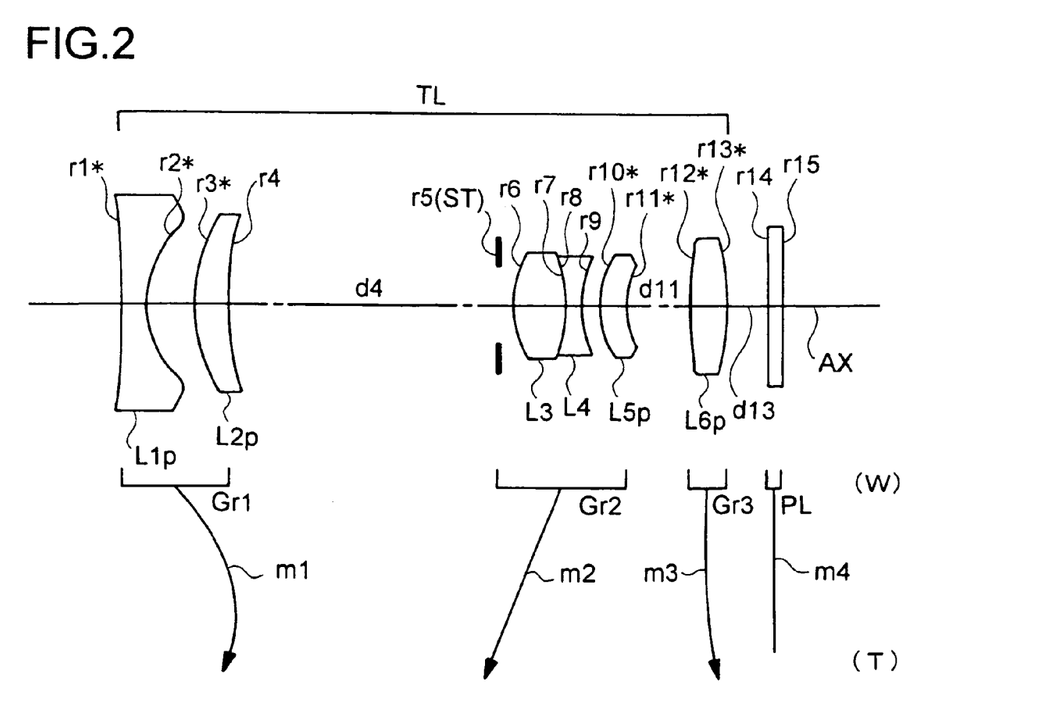
FIG. 2 is a lens construction diagram of a second embodiment (Example 2) of the invention.
Figure 3:
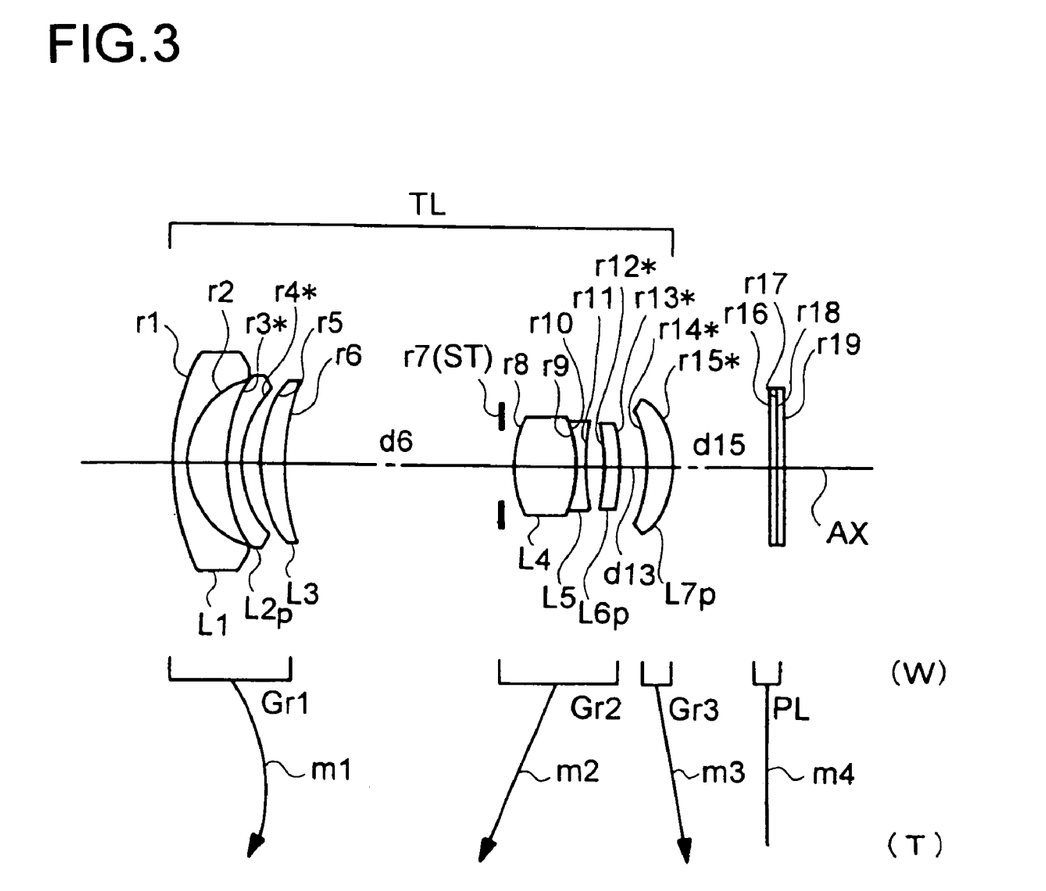
FIG. 3 is a lens construction diagram of a third embodiment (Example 3) of the invention.
Figure 4A:
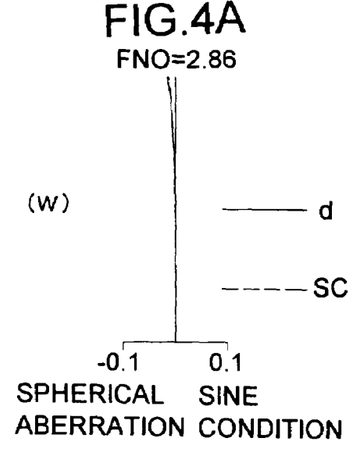
FIGS. 4A to 4I are aberration diagrams of Example 1.
Figure 4B:
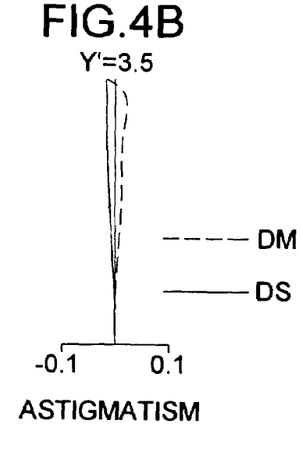
Figure 4C:
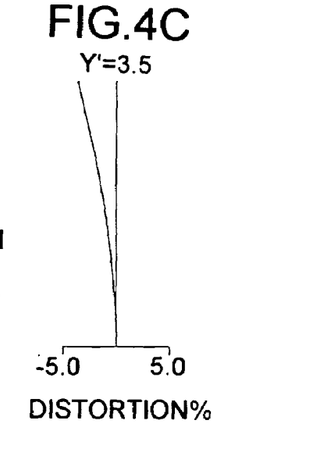
Figure 4D:
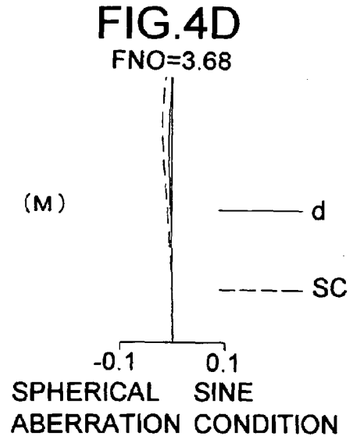
Figure 4E:
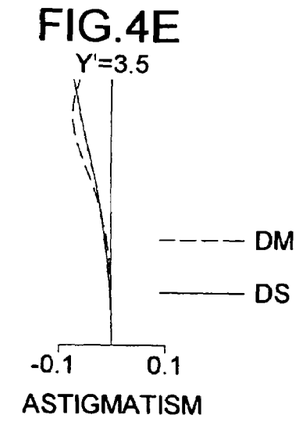
Figure 4F:
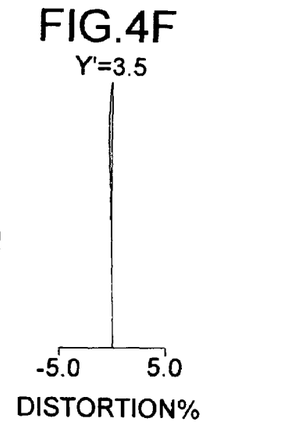
Figure 4G:
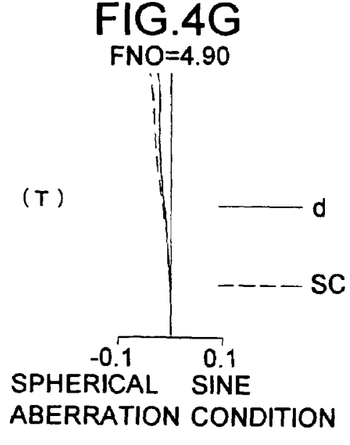
Figure 4H:
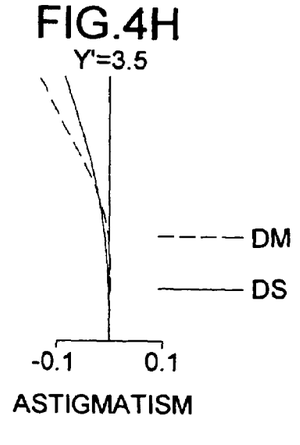
Figure 4I:
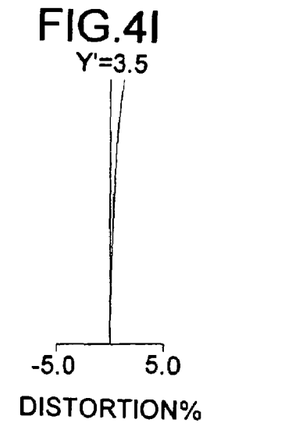
Figure 5A:
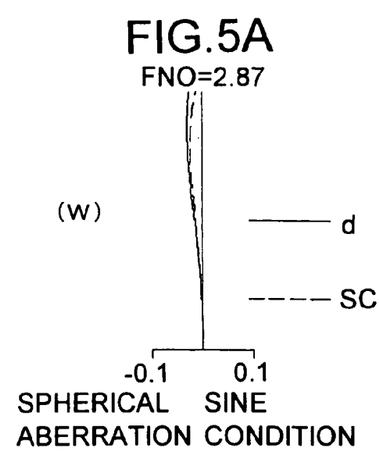
FIGS. 5A to 5I are aberration diagrams of Example 2.
Figure 5B:
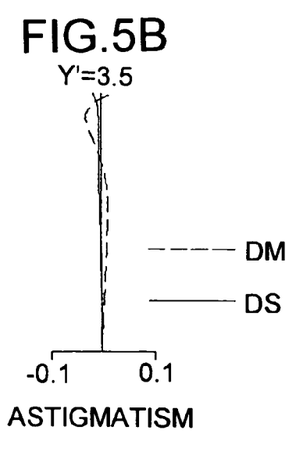
Figure 5C:
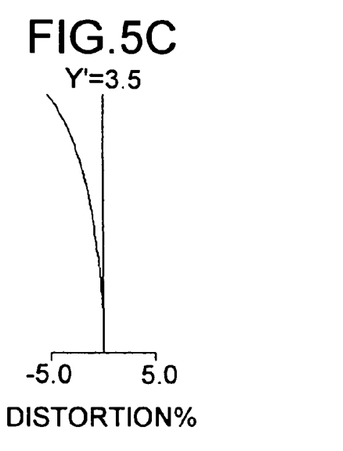
Figure 5D:
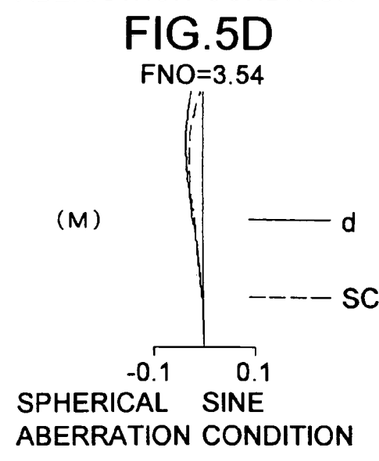
Figure 5E:
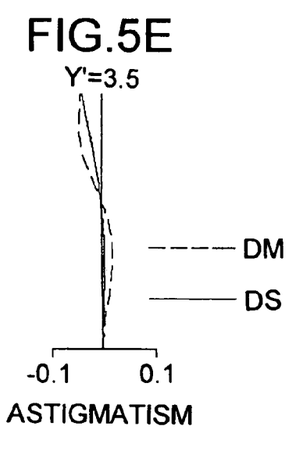
Figure 5F:
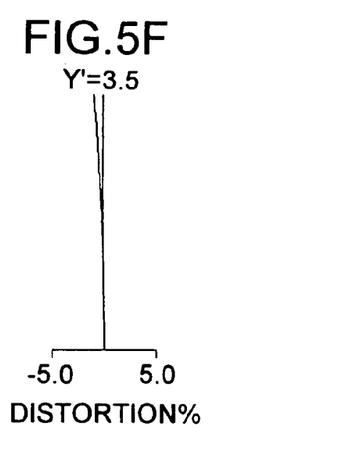
Figure 5G:
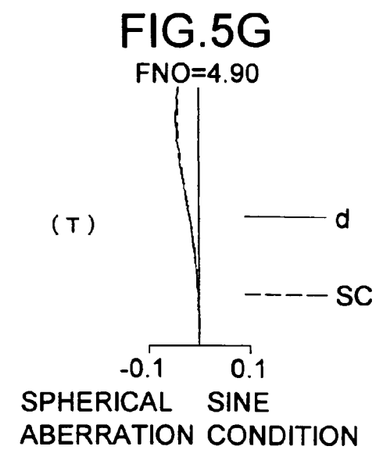
Figure 5H:
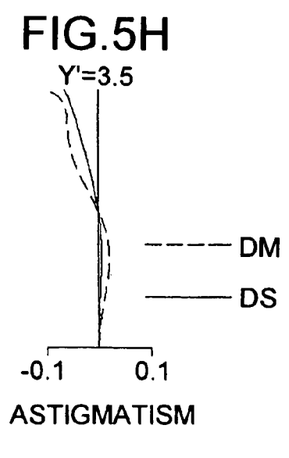
Figure 5I:
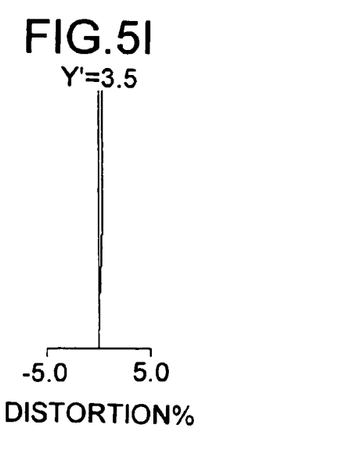
Figure 6A:
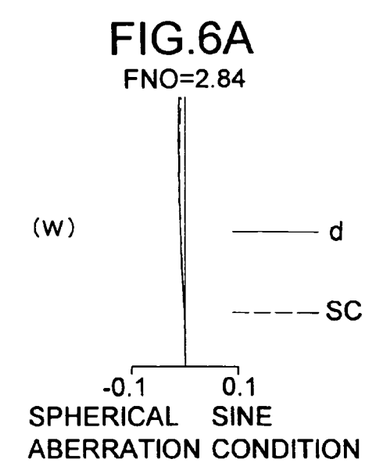
FIGS. 6A to 6I are aberration diagrams of Example 3.
Figure 6B:
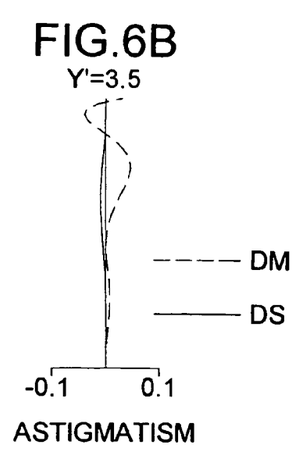
Figure 6C:
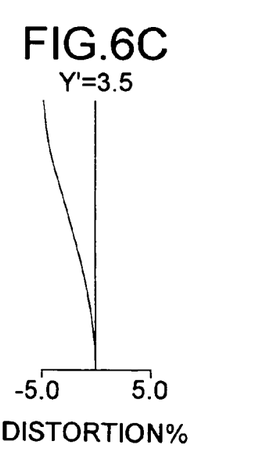
Figure 6D:
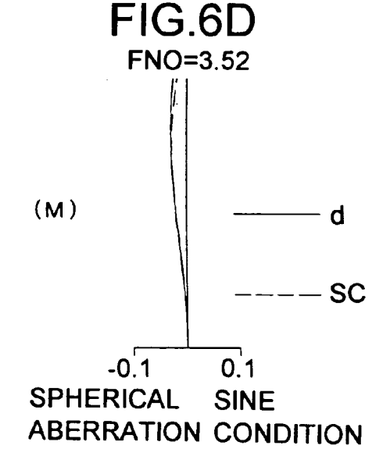
Figure 6E:
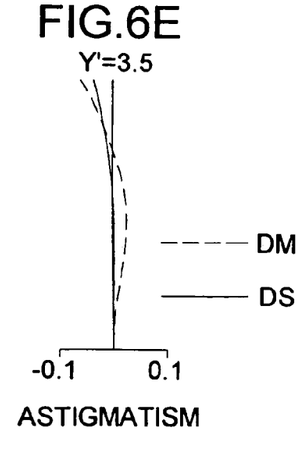
Figure 6F:
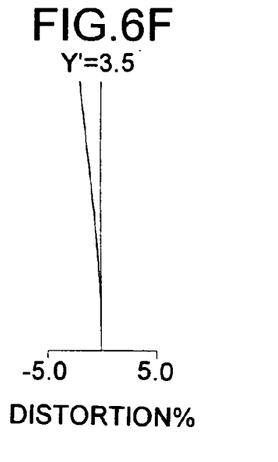
Figure 6G:
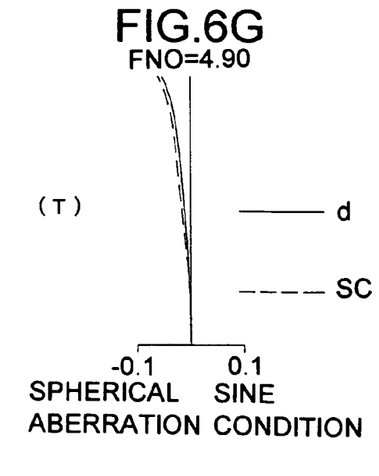
Figure 6H:
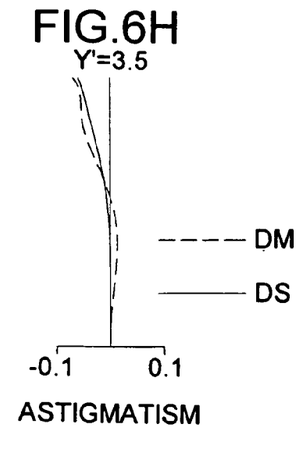
Figure 6I:
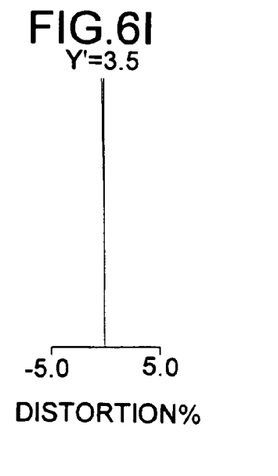

FIGS. 1 to 3 are lens construction diagrams corresponding to the zoom lens systems TL used in a first to a third embodiment, respectively, of the invention, each showing the lens construction as observed at the wide-angle end W in an optical section. In each lens construction diagram, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, though only those axial distances which vary as zooming is performed, i.e., variable axial distances, are shown here. A lens element marked as Lj (j=1, 2, 3, . . . ) is the j-th lens element from the object side, with a letter "p" following Lj indicating a plastic lens element. Moreover, in each lens construction diagram, arrows m1, m2, and m3 schematically indicate the movement of the first, second, and third lens units Gr1, Gr2, and Gr3, respectively, during zooming from the wide-angle end W to the telephoto end T, and a straight line m4 indicates that the parallel-plane plate PL is kept in a fixed position during zooming. In all the embodiments, during zooming, the first lens unit Gr1 moves first toward the image side and then slightly back toward the object side as if to make a U-turn, the second lens unit Gr2 moves straight toward the object side, and the third lens unit Gr3 moves toward the image side.

In all of the first to third embodiments, the zoom lens system TL is constructed as a three-unit zoom lens system that is composed of, from the object side thereof, a first lens unit GR1 having a negative optical power (an optical power is a quantity defined as the reciprocal of a focal length), a second lens unit GR2 having a positive optical power, and a third lens unit GR3 having a positive optical power and that achieves zooming by moving at least the first and second lens units GR1 and GR2 in such a way as to vary the distances between the individual lens units. During zooming from the wide-angle end W to the telephoto end T, the second lens unit Gr2 moves toward the object side so that the distance between the first and second lens units Gr1 and Gr2 decreases. That is, zooming is achieved as a result of the second lens unit Gr2 moving toward the object side so as to function as a variator, and the resulting deviation of the focal point is corrected by the movement of the first lens unit Gr1. Adopting this zoom construction makes it possible to satisfactorily correct the image plane in the middle-focal-length state. Now, the lens construction of each embodiment will be described in more detail.

In the first embodiment (FIG. 1), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus glass lens element convex to the object side. The second lens unit Gr2 is composed of, from the object side, an aperture stop ST, a third lens element L3, a fourth lens element L4, and a fifth lens element L5. The third lens element L3 is a biconvex positive plastic lens element having an aspherical surface on the object side. The fourth lens element L4 is a negative meniscus glass lens element concave to the image side. The fifth lens element L5 is a biconvex positive plastic lens element having aspherical surfaces on both sides. The third lens unit Gr3 is composed solely of a sixth lens element L6. The sixth lens element L6 is a positive meniscus plastic lens element convex to the object side and having aspherical surfaces on both sides.

In the second embodiment (FIG. 2), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side and having an aspherical surface on the object side. The second lens unit Gr2 is composed of, from the object side, an aperture stop ST, a cemented lens element formed by cementing together a third lens element L3 and a fourth lens element L4, and a fifth lens element L5. The third lens element L3 is a biconvex positive glass lens element. The fourth lens element L4 is a biconcave negative glass lens element. The fifth lens element L5 is a positive meniscus plastic lens element convex to the object side and having aspherical surfaces on both sides. The third lens unit Gr3 is composed solely of a sixth lens element L6. The sixth lens element L6 is a biconvex positive plastic lens element having aspherical surfaces on both sides.

In the third embodiment (FIG. 3), in a three-unit zoom construction composed of a negative, a positive, and a positive lens unit, each lens unit is built as follows. The first lens unit Gr1 is composed of, from the object side, a first lens element L1, a second lens element L2, and a third lens element L3. The first lens element L1 is a negative meniscus glass lens element concave to the image side. The second lens element L2 is a negative meniscus plastic lens element concave to the image side and having aspherical surfaces on both sides. The third lens element L3 is a positive meniscus glass lens element convex to the object side. The second lens unit Gr2 is composed of, from the object side, an aperture stop ST, a cemented lens element formed by cementing together a fourth lens element L4 and a fifth lens element L5, and a sixth lens element L6. The fourth lens element L4 is a biconvex positive glass lens element. The fifth lens element L5 is a biconcave negative glass lens element. The sixth lens element L6 is a positive meniscus plastic lens element convex to the image side and having aspherical surfaces on both sides. The third lens unit Gr3 is composed solely of a seventh lens element L7. The seventh lens element L7 is a positive meniscus plastic lens element convex to the image side having aspherical surfaces on both sides.

As described above, in all the embodiments, the first, second, and third lens units Gr1, Gr2, and Gr3 each include at least one plastic lens element, and the zoom lens system TL as a whole includes at least one glass lens element. In an optical construction including both plastic and glass lens elements in this way, appropriately setting the average refractive index of the glass lens elements makes it possible to realize a compact, easy-to-manufacture image-taking apparatus incorporating an inexpensive, high-optical-performance zoom lens system. Using the image-taking apparatuses of the embodiments in devices such as digital cameras and portable data terminals contributes to making such devices slim, lightweight, compact, inexpensive, high-performance, intelligent, and otherwise better. Now, the conditions that should preferably be fulfilled to obtain a proper balance among such benefits and to achieve higher optical performance and other advantages will be described.

In the zoom lens system, attempting to simultaneously obtain compactness and a wide angle by increasing the negative optical power of the first lens unit results in making it difficult to correct off-axial aberrations with the spherical surfaces included in the first lens unit alone. On the other hand, attempting to obtain telecentricity by increasing the positive optical power of the last lens element results in making it difficult to correct off-axial aberrations with the spherical surfaces included in the third lens unit alone. For example, attempting to reduce the front lens diameter by increasing the optical power of the first lens unit results in producing distortion, which then needs to be corrected. On the other hand, attempting to make the zoom lens system telecentric by increasing the positive optical power of the last lens element disposed at the image-side end results in causing the image plane to lean toward the object side (the under side), which then needs to be corrected. To avoid these inconveniences, in all the embodiments, for easy correction of aberrations, aspherical surfaces are used in the first lens unit Gr1 and in the last lens element L6 or L7 disposed on the image-side end. It is preferable that, in this way, an aspherical surface be introduced in the first lens unit and at least one surface of the last lens element disposed on the image-side end be an aspherical surface. This makes it possible to satisfactorily correct distortion and curvature of field. Introducing in the first lens unit an aspherical surface for reducing distortion results in producing coma, which in turn can be corrected by introducing an aspherical surface in the second lens unit. Accordingly, it is further preferable that at least one surface in the second lens unit be an aspherical surface.

A lens element having an aspherical surface may be formed as a glass-molded lens element, a composite aspherical-surface lens element, a plastic lens element, or the like. Among these, in terms of the cost-performance ratio, using a lens element formed of plastic helps effectively achieve cost reduction. As described above, using plastic lens elements is effective in making a zoom lens system inexpensive, and using plastic aspherical-surface lens elements is effective further in obtaining satisfactory optical performance. However, since plastic lens elements have low refractive indices, their use makes it difficult to reduce the Petzval sum. Specifically, increasing the optical power of a plastic lens element with a view to reducing the Petzval sum results in increasing the curvatures of its lens surfaces, and this makes correction of aberrations difficult.

Accordingly, in a zoom lens system, it is preferable that the lens units each include at least one plastic lens element, and in addition that the zoom lens system as a whole include at least one glass lens element that fulfills conditional formula (1) below.

$$1.76 < Nav \quad (1)$$

where

Nav represents the average refractive index of the at least one glass lens element for the d-line.

Conditional formula (1) defines the conditional range that should preferably be fulfilled with respect to the average refractive index of all the glass lens elements used. Using in the zoom lens system as a whole one or more glass lens elements in such a way as to fulfill conditional formula (1) makes it possible to reduce the Petzval sum without increasing the curvatures of the lens surfaces. This makes it possible to realize a satisfactorily compact and inexpensive zoom lens system while securing high optical performance, and also to effectively reduce the number of lens elements required. If the lower limit of conditional formula (1) is disregarded, to reduce the Petzval sum and thereby correct curvature of field, it is necessary either to increase the optical powers of the lens elements or to increase the number of lens elements used. This makes the lens elements difficult to fabricate, or makes the zoom lens system unduly large.

It is further preferable that conditional formula (1a) below be fulfilled.

$$1.80 < Nav \quad (1a)$$

This conditional formula (1a) defines a further preferable conditional range within that defined by conditional formula (1) above from the above-mentioned viewpoints and out of other considerations.

In an image-taking apparatus incorporating a zoom lens system, to match the pupil with the microlenses provided so as to correspond to the individual pixels of an image sensor, in particular a high-resolution one, it is necessary to locate the exit pupil position of the zoom lens system comparatively far away from the image plane (i.e., to make the zoom lens system telecentric). To achieve this, it is preferable that, as in all the embodiments, the last lens element be given a positive optical power. Giving the last lens element a positive optical power makes it easy to make off-axial rays travel in the direction parallel to the optical axis and thereby obtain telecentricity. Moreover, to make a zoom lens system compact, it is preferable to adopt a rear focus system whereby focusing is achieved by the use of the most image-side lens unit. In a case where the rear focus system is adopted in a three-unit zoom construction composed of a negative, a positive, and a positive lens unit, building the third lens unit with only one lens element makes it possible to reduce the driving force needed for focusing and to achieve fast focusing. In addition, using a plastic lens element as the last lens element helps achieve weight reduction, which thus helps further reduce the load on the driving systems for focusing and zooming. Accordingly, it is preferable that, as in all the embodiments, the third lens unit be composed of one single lens element.

As described earlier, using plastic lens elements is effective in making a zoom lens system inexpensive, and introducing aspherical surfaces in plastic elements is effective further in obtaining higher optical performance and in reducing the number of lens elements required. Accordingly, it is preferable that, as in all the embodiments, all plastic lens elements each either have an aspherical surface on one side or have aspherical surfaces on both sides. The same benefits of aspherical surfaces can be obtained by introducing aspherical surfaces in glass lens elements. However, as described earlier, using a glass-molded lens element or the like increases costs, and thus results in canceling the effect of cost reduction achieved by the use of plastic lens elements. Accordingly, it is preferable that no glass aspherical-surface lens elements, such as glass-molded ones, be included in a zoom lens system. In other words, it is preferable that all glass lens elements be spherical lens elements.

As described earlier, since plastic lens elements have low refractive indices, using many of them makes it difficult to reduce the Petzval sum. Specifically, increasing the optical power of a plastic lens element with a view to reducing the Petzval sum results in increasing the curvatures of its lens surfaces, and this makes correction of aberrations difficult. From this viewpoint, it is preferable that the zoom lens system as a whole include two or more glass lens elements. Adding one or more further glass lens elements, i.e., high-refractive-index lens elements, in this way makes it possible to further reduce the Petzval sum. Moreover, it is preferable that a zoom lens system include seven or less lens elements. By reducing the number of lens elements used in a zoom lens system as a whole to seven or less, it is possible to achieve cost reduction and compactness.

With respect to the optical power of the first lens unit, it is preferable that conditional formula (2) below be fulfilled.

$$1 < |f1|/\sqrt{fw \times ft} < 3 \quad (2)$$

where f1 represents the focal length of the first lens unit;

fw represents the focal length of the zoom lens system as a whole at the wide-angle end; and ft represents the focal length of the zoom lens system as a whole at the telephoto end.

Conditional formula (2) defines the conditional range that should preferably be fulfilled with respect to the optical power of the first lens unit. Fulfilling conditional formula (2) makes it possible to more satisfactorily correct distortion. If the lower limit of conditional formula (2) is disregarded, the optical power of the first lens unit is so strong that it is difficult to correct the negative distortion appearing in the wide-angle region. By contrast, if the upper limit of conditional formula (2) is disregarded, the optical power of the first lens unit is so weak that it is difficult to sharply bend off-axial rays in the wide-angle region so as to reduce the front lens diameter.

It is further preferable that conditional formula (2a) below be fulfilled.

$$1 < |f1|/\sqrt{fw \times ft} < 2 \quad (2a)$$

This conditional formula (2a) defines a further preferable conditional range within that defined by conditional formula (2) above from the above-mentioned viewpoints and out of other considerations.

In all the embodiments, the zoom lens system TL is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material.

It is to be understood that the embodiments described above and the practical examples described later include the constructions described below, and with these constructions, it is possible to realize zoom lens systems that offer satisfactory optical performance and ensure good productivity despite being compact and inexpensive. By using them as image-taking lens systems in digital cameras, portable data devices (such as cellular phones and PDAs), and the like, it is possible to contribute to making such devices lightweight, compact, inexpensive, high-performance, intelligent, and otherwise better.

(Z1) A zoom lens system comprising a plurality of lens units and achieving zooming by varying the distances between the lens units, wherein the zoom lens system includes three lens units, namely, from the object side thereof, a first lens unit having a negative optical power, a second lens unit having a positive optical power, and a third lens unit having a positive optical power, the lens units each include at least one plastic lens element, and the zoom lens system as a whole includes at least one glass lens element that fulfills conditional formula (1) or (1a) noted earlier.

(Z2) A zoom lens system as described in (Z1) above, wherein, during zooming from the wide-angle end to the telephoto end, the distance between the first and second lens units decreases.

(Z3) A zoom lens system as described in (Z1) or (Z2) above, wherein all plastic lens elements each either have an aspherical surface on one side or have aspherical surfaces on both sides.

(Z4) A zoom lens system as described in one of (Z1) to (Z3) above, wherein all glass lens elements are spherical-surface lens elements.

(Z5) A zoom lens system as described in one of (Z1) to (Z4) above, wherein the zoom lens system as a whole includes two or more glass lens elements.

(Z6) A zoom lens system as described in one of (Z1) to (Z5) above, wherein the zoom lens system includes seven or less lens elements.

(Z7) A zoom lens system as described in one of (Z1) to (Z6) above, wherein conditional formula (2) or (2a) noted earlier is fulfilled.

(Z8) A zoom lens system as described in one of (Z1) to (Z7) above, wherein the second lens unit includes an aperture stop at the object-side end thereof.

(U1) An image-taking apparatus comprising a zoom lens system as described in one of (Z1) to (Z8) above and an image sensor for converting the optical image formed by the zoom lens system into an electrical signal.

(C1) A camera comprising an image-taking apparatus as described in (U1) above so as to be used for shooting at least either a still picture of a subject or a moving picture of a subject.

(C2) A camera as described in (C1) above, wherein the camera is a digital camera, video camera, or a camera incorporated in or externally fitted to a cellular phone, personal digital assistant, personal computer, mobile computer, or peripheral device therefor.

(D1) A digital device comprising an image-taking apparatus as described in (U1) above so as to be additionally capable of shooting at least either a still picture of a subject or a moving picture of a subject.

(D2) A digital device as described in (D1) above, wherein the digital device is a cellular phone, personal digital assistant, personal computer, mobile computer, or peripheral device therefor.

EXAMPLES

Hereinafter, the construction and other features of practical examples of the zoom lens system used in an image-taking apparatus embodying the present invention will be presented with reference to their construction data and other data. Examples 1 to 3 presented below are numerical examples corresponding to the first to third embodiments, respectively, described hereinbefore, and therefore the optical construction diagrams (FIGS. 1 to 3) of the first to third embodiments also show the lens construction of Examples 1 to 3, respectively.

Tables 1 to 3 show the construction data of Examples 1 to 3, respectively. Table 4 shows the values of the conditional formulae as actually observed in each example. In the basic optical construction (with "i" representing the surface number) presented in each of Tables 1 to 3, ri (i=1, 2, 3, . . . ) represents the radius of curvature (in mm) of the i-th surface from the object side, di (i=1, 2, 3, . . . ) represents the axial distance (in mm) between the i-th and (i+1)-th surfaces from the object side, and Nd and νd respectively represent the refractive index for the d-line and the Abbe number of the optical material filling the axial distance di. For each of those axial distances di which vary during zooming, i.e. variable axial distances, three values are listed, namely, from left, the axial distance observed at the wide-angle end (in the shortest-focal-length state, W), the axial distance observed at the middle (in the middle-focal-length state, M), and the axial distance observed at the telephoto end (in the longest-focal-length state, T). Shown together with these data are the focal length (f, mm) and f-number (FNO) of the entire system observed in those three different focal-length states W, M, and T.

A surface of which the radius of curvature ri is marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (AS) below. The aspherical surface data of the aspherical surfaces used in each example are also shown in Tables 1 to 3. It should be noted, however, that any coefficient that equals zero is omitted, and that, for any relevant data, "E−n" represents "×10⁻ⁿ" and "E+n" represents "×10⁺ⁿ."

$$X(H) = (C0 \cdot H^2)/(1+\sqrt{1-\epsilon \cdot C0^2 \cdot H^2}) + \Sigma(Aj \cdot H^j) \quad \text{(AS)}$$

where
- $X(H)$ represents the displacement along the optical axis AX at the height H (relative to the vertex);
- H represents the height in a direction perpendicular to the optical axis AX,
- $C0$ represents the paraxial curvature ($=1/ri$);
- $\epsilon$ represents the quadric surface parameter; and
- $Aj$ represents the aspherical surface coefficient of j-th order.

FIGS. 4A to 4I, FIGS. 5A to 5I, and FIGS. 6A to 6I are aberration diagrams of Examples 1 to 3, respectively, all obtained in the state focused at infinity. Of these aberration diagrams, FIGS. 4A, 4B, 4C, 5A, 5B, 5C, 6A, 6B, and 6C show the aberrations observed at the wide-angle end W, FIGS. 4D, 4E, 4F, 5D, 5E, 5F, 6D, 6E, and 6F show the aberrations observed at the middle M, and FIGS. 4G, 4H, 4I, 5G, 5H, 5L 6G, 6H, and 6I show the aberrations observed at the telephoto end T. Of these aberration diagrams, FIGS. 4A, 4D, 4G, 5A, 5D, 5G, 6A, 6D, and 6G show spherical aberration, FIGS. 4B, 4E, 4H, 5B, 5E, 5H, 6B, 6E, and 6H show astigmatism, and FIGS. 4C, 4F, 4I, 5C, 5F, 5I, 6C, 6F, and 6I show distortion. The symbol FNO represents the f-number, and the symbol Y' (mm) represents the maximum image height (corresponding to the distance from the optical axis AX) on the light-receiving surface SS of the image sensor SR. In the spherical aberration diagrams, the solid line (d) represents the spherical aberration (mm) observed for the d-line, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, in a zoom lens system, the individual lens units each include a plastic lens element, the zoom lens system as a whole includes at least one glass lens element, and the average refractive index of the at least one glass lens element is set appropriately. This makes it possible to realize a compact, easy-to-manufacture image-taking apparatus incorporating an inexpensive, high-optical-performance zoom lens system. By applying an image-taking apparatus according to the present invention in devices such as digital cameras and portable data terminals, it is possible to contribute to making such devices slim, lightweight, compact, inexpensive, high-performance, intelligent, and otherwise better.

TABLE 1

| Example 1 | f [mm] | | 6.30(W)~10.64(M)~17.96(T) | | |
|---|---|---|---|---|---|
| | FNO | | 2.87(W)~3.68(M)~4.90(T) | | |
| i | ri [mm] | di [mm] | Nd | νd | Element, etc. |
| 1 | −25.000 * | 1.800 | 1.53048 | 55.72 | L1p  Gr1 (−) |
| 2 | 5.610 * | 3.101 | | | |
| 3 | 10.549 | 2.400 | 1.84666 | 23.78 | L2 |
| 4 | 17.411 | 16.126(W)~7.714(M)~2.041(T) | | | ST |
| 5 | ∞ | 0.400 | | | |
| 6 | 7.900 * | 2.818 | 1.53048 | 55.72 | L3p  Gr2 (+) |
| 7 | −22.405 | 1.032 | | | |
| 8 | 23.874 | 1.889 | 1.84666 | 23.78 | L4 |
| 9 | 6.500 | 1.325 | | | |
| 10 | 25.197 * | 1.512 | 1.53048 | 55.72 | L5p |
| 11 | −10.761 * | 6.101(W)~13.903(M)~23.788(T) | | | |
| 12 | 17.979 * | 2.600 | 1.53048 | 55.72 | L6p  Gr3 (+) |
| 13 | 1952.248 * | 4.307(W)~2.669(M)~2.142(T) | | | |
| 14 | ∞ | 0.500 | 1.54426 | 69.60 | PL |
| 15 | ∞ | 1.000 | | | |
| 16 | ∞ | 1.500 | 1.51680 | 64.20 | |
| 17 | ∞ | | | | |

| Aspherial Surface Data of the i-th Surface (*) | | | | | |
|---|---|---|---|---|---|
| i | ε | A4 | A6 | A8 | A10 |
| 1 | 1.0000 | 0.47194787E-3 | −0.10269063E-4 | 0.76344824E-7 | 0.47863236E-9 |
| 2 | 1.0000 | −0.89700534E-4 | −0.95381188E-5 | −0.79118824E-6 | |
| 6 | 1.0000 | −0.47575255E-3 | −0.54978046E-5 | −0.78014079E-7 | 0.44201380E-8 |
| 10 | 1.0000 | −0.74404885E-4 | 0.34439494E-4 | 0.15700360E-6 | |
| 11 | 1.0000 | −0.37507088E-3 | 0.15772932E-4 | −0.74745486E-8 | |
| 12 | 1.0000 | 0.13118603E-3 | 0.42000375E-5 | 0.42153674E-6 | |
| 13 | 1.0000 | 0.38750036E-3 | −0.47705971E-5 | 0.10109012E-5 | 0.10518026E-7 |

TABLE 2

| Example 2 | | f [mm] | 6.30(W)~10.64(M)~17.96(T) | | |
|---|---|---|---|---|---|
| | | FNO | 2.88(W)~3.54(M)~4.90(T) | | |
| i | ri [mm] | di [mm] | Nd | νd | Element, etc. |
| 1 | -40.214 * | 1.800 | 1.53048 | 55.72 | L1p / Gr1 (-) |
| 2 | 6.703 * | 3.500 | | | |
| 3 | 11.180 * | 2.400 | 1.62017 | 24.01 | L2p |
| 4 | 23.002 | 18.604(W)~6.886(M)~1.158(T) | | | ST |
| 5 | ∞ | 1.000 | | | |
| 6 | 7.118 | 3.500 | 1.83481 | 42.72 | L3 / Gr2 (+) |
| 7 | -12.681 | 0.010 | 1.51400 | 42.83 | |
| 8 | -12.681 | 1.200 | 1.80518 | 25.46 | L4 |
| 9 | 8.691 | 1.200 | | | |
| 10 | 5.234 * | 1.800 | 1.53048 | 55.72 | L5p |
| 11 | 6.338 * | 4.366(W)~8.076(M)~16.370(T) | | | |
| 12 | 19.777 * | 2.600 | 1.53048 | 55.72 | L6p / Gr3 (+) |
| 13 | -33.303 * | 2.775(W)~3.106(M)~1.412(T) | | | |
| 14 | ∞ | 1.000 | 1.54426 | 69.60 | PL |
| 15 | ∞ | | | | |

| Aspherial Surface Data of the i-th Surface (*) | | | | |
|---|---|---|---|---|
| i | ε | A4 | A6 | A8 | A10 |
| 1 | 1.0000 | 0.65827515E-3 | -0.19707352E-4 | 0.27504984E-6 | -0.18864547E-8 |
| 2 | 1.0000 | 0.52332489E-3 | -0.77608889E-5 | -0.65727495E-6 | |
| 3 | 1.0000 | 0.15198955E-4 | 0.47645959E-5 | -0.21092830E-6 | |
| 10 | 1.0000 | -0.40606058E-3 | -0.50542040E-4 | -0.69204997E-5 | |
| 11 | 1.0000 | 0.17675780E-2 | -0.69367389E-5 | -0.10756071E-4 | |
| 12 | 1.0000 | -0.53378966E-3 | 0.40002221E-4 | -0.15785796E-5 | |
| 13 | 1.0000 | -0.44715137E-3 | 0.60968912E-5 | 0.11947368E-5 | -0.74835983E-7 |

TABLE 3

| Example 3 | | f [mm] | 5.90(W)~10.0(M)~17.00(T) | | |
|---|---|---|---|---|---|
| | | FNO | 2.84(W)~3.53(M)~4.90(T) | | |
| i | ri [mm] | di [mm] | Nd | νd | Element, etc. |
| 1 | 17.879 | 1.090 | 1.74330 | 49.22 | L1 / Gr1 (-) |
| 2 | 6.377 | 2.878 | | | |
| 3 | 17.267 * | 1.000 | 1.53048 | 55.72 | L2p |
| 4 | 7.186 * | 1.429 | | | |
| 5 | 9.470 | 1.800 | 1.84666 | 23.78 | L3 |
| 6 | 16.495 | 15.971(W)~6.606(M)~1.746(T) | | | |
| 7 | ∞ | 1.000 | | | ST |
| 8 | 8.020 | 4.550 | 1.80420 | 46.50 | L4 / Gr2 (+) |
| 9 | -9.747 | 0.010 | 1.51400 | 42.83 | |
| 10 | -9.747 | 0.800 | 1.84666 | 23.78 | L5 |
| 11 | 28.128 | 1.366 | | | |
| 12 | -10.913 * | 1.059 | 1.53048 | 55.72 | L6p |
| 13 | -9.018 * | 2.000(W)~7.241(M)~17.971(T) | | | |
| 14 | -17.079 * | 1.947 | 1.53048 | 55.72 | L7p / Gr3 (+) |
| 15 | -9.546 * | 7.029(W)~6.411(M)~2.500(T) | | | |
| 16 | ∞ | 0.500 | 1.51680 | 64.20 | |
| 17 | ∞ | 0.000 | | | PL |
| 18 | ∞ | 0.500 | 1.51680 | 64.20 | |
| 19 | ∞ | | | | |

TABLE 3-continued

| Aspherial Surface Data of the i-th Surface (*) | | | | | |
|---|---|---|---|---|---|
| i | ε | A4 | A6 | A8 | A10 |
| 3 | 1.0000 | -0.13197957E-3 | 0.14784731E-4 | 0.18083120E-6 | -0.39484580E-8 |
| 4 | 1.0000 | -0.46993204E-3 | 0.44108825E-5 | 0.83405442E-6 | -0.25836952E-7 |
| 12 | 1.0000 | -0.51841661E-3 | 0.47190818E-4 | 0.11727851E-4 | -0.67767453E-6 |
| 13 | 1.0000 | 0.49315134E-3 | 0.61042415E-4 | 0.97839444E-5 | -0.48170440E-6 |
| 14 | 1.0000 | -0.11573726E-2 | -0.24882312E-5 | 0.77628716E-6 | -0.11527065E-6 |
| 15 | 1.0000 | -0.78232753E-3 | -0.92330913E-5 | 0.10559231E-5 | -0.65968594E-7 |

TABLE 4

| Example | Conditional Formula (1), (1a) Nav | Conditional Formula (2), (2a) $|f1/\sqrt{fw \times ft}|$ |
|---|---|---|
| 1 | 1.84666 | 1.261385 |
| 2 | 1.819995 | 1.678094 |
| 3 | 1.810205 | 1.387137 |

What is claimed is:

1. A zoom lens system for forming an optical image of a subject on an image-sensing surface of an image sensor,
   wherein the zoom lens system comprises three lens units, namely, from an object side thereof, a first lens unit having a negative optical power, a second lens unit having a positive optical power, and a third lens unit having a positive optical power,
   wherein the lens units each include at least one plastic lens element,
   wherein the zoom lens system includes seven or less lens elements, and
   wherein the zoom lens system as a whole includes a plurality of glass lens elements that fulfill the following conditional formula (1a):

$$1.80 < Nav \quad (1a)$$

where
   Nav represents an average refractive index of the plurality of glass lens elements for a d-line.

2. A zoom lens system as claimed in claim 1, wherein, during zooming from a wide-angle end to a telephoto end, a distance between the first and second lens units decreases.

3. A zoom lens system as claimed in claim 1, wherein all plastic lens elements each either have an aspherical surface on one side or have aspherical surfaces on both sides.

4. A zoom lens system as claimed in claim 1, wherein all glass lens elements are spherical-surface lens elements.

5. A zoom lens system as claimed in claim 1, wherein the zoom lens system as a whole includes two or more glass lens elements.

6. A zoom lens system as claimed in claim 1, wherein the following conditional formula (2) is fulfilled:

$$1 < |f1/\sqrt{fw \times ft}| < 3 \quad (2)$$

where
   f1 represents a focal length of the first lens unit;
   fw represents a focal length of the zoom lens system as a whole at the wide-angle end; and
   ft represents a focal length of the zoom lens system as a whole at the telephoto end.

7. An image-taking apparatus comprising a zoom lens system that includes a plurality of lens units and that achieves zooming by varying distances between the lens units and an image sensor that converts an optical image formed by the zoom lens system into an electrical signal,
   wherein the zoom lens system comprises three lens units, namely, from an object side thereof, a first lens unit having a negative optical power, a second lens unit having a positive optical power, and a third lens unit having a positive optical power,
   wherein the lens units each include at least one plastic lens element,
   wherein the zoom lens system includes seven or less lens elements, and
   wherein the zoom lens system as a whole includes a plurality of glass lens elements that fulfill the following conditional formula (1a):

$$1.80 < Nav \quad (1a)$$

where
   Nav represents an average refractive index of the plurality of glass lens elements for a d-line.

8. An image-taking apparatus as claimed in claim 7, wherein, during zooming from a wide-angle end to a telephoto end, a distance between the first and second lens units decreases.

9. An image-taking apparatus as claimed in claim 7, wherein all plastic lens elements each either have an aspherical surface on one side or have aspherical surfaces on both sides.

10. An image-taking apparatus as claimed in claim 7, wherein all glass lens elements are spherical-surface lens elements.

11. An image-taking apparatus as claimed in claim 7, wherein the zoom lens system as a whole includes two or more glass lens elements.

12. An image-taking apparatus as claimed in claim 7, wherein the following conditional formula (2) is fulfilled:

$$1 < |f1/\sqrt{fw \times ft}| < 3 \quad (2)$$

where
- f1 represents a focal length of the first lens unit;
- fw represents a focal length of the zoom lens system as a whole at the wide-angle end; and
- ft represents a focal length of the zoom lens system as a whole at the telephoto end.

13. A camera comprising an image-taking apparatus that takes in an image of a subject optically and that then outputs the optical image in a form of an electrical signal,
   wherein the image-taking apparatus comprises a zoom lens system that includes a plurality of lens units and that achieves zooming by varying distances between the lens units and an image sensor that converts an optical image formed by the zoom lens system into an electrical signal,
   wherein the zoom lens system comprises three lens units, namely, from an object side thereof, a first lens unit having a negative optical power, a second lens unit having a positive optical power, and a third lens unit having a positive optical power,
   wherein the lens units each include at least one plastic lens element,
   wherein the zoom lens systems includes seven or less lens elements, and
   wherein the zoom lens system as a whole includes a plurality of glass lens elements that fulfill the following conditional formula (1a):

$$1.80 < \text{Nav} \tag{1a}$$

where
   Nav represents an average refractive index of the plurality of glass lens elements for a d-line.

14. A camera as claimed in claim 13,
   wherein, during zooming from a wide-angle end to a telephoto end, a distance between the first and second lens units decreases.

15. A camera as claimed in claim 13,
   wherein all plastic lens elements each either have an aspherical surface on one side or have aspherical surfaces on both sides.

16. A camera as claimed in claim 13,
   wherein all glass lens elements are spherical-surface lens elements.

17. A camera as claimed in claim 13,
   wherein the zoom lens system as a whole includes two or more glass lens elements.

* * * * *